(12) United States Patent
Schaerer et al.

(10) Patent No.: US 10,708,362 B2
(45) Date of Patent: Jul. 7, 2020

(54) TRANSMITTING MACHINE ACCESS DATA TO A WIRELESS MEASUREMENT SENSOR OF THE MACHINE

(71) Applicants: TRUMPF Werkzeugmaschinen GmbH + Co. KG, Ditzingen (DE); TRUMPF Schweiz AG, Gruesch (CH)

(72) Inventors: Andrea Schaerer, Gruesch (CH); Hans-Peter Bock, Tamm (DE); Christian Georg, Moeglingen (DE)

(73) Assignees: TRUMPF Werkzeugmaschinen GmbH + Co. KG, Ditzinger (DE); TRUMPF Schweiz AG, Greusch (CH)

( * ) Notice: Subject to any disclaimer, the term of this patent is extended or adjusted under 35 U.S.C. 154(b) by 0 days.

(21) Appl. No.: 15/978,267

(22) Filed: May 14, 2018

(65) Prior Publication Data
US 2018/0262572 A1   Sep. 13, 2018

Related U.S. Application Data

(63) Continuation of application No. PCT/EP2016/076793, filed on Nov. 7, 2016.

(30) Foreign Application Priority Data

Nov. 13, 2015   (DE) .................. 10 2015 222 395

(51) Int. Cl.
*H04L 29/08* (2006.01)
*G01H 1/00* (2006.01)
(Continued)

(52) U.S. Cl.
CPC .............. *H04L 67/12* (2013.01); *B23Q 17/12* (2013.01); *B23Q 17/22* (2013.01);
(Continued)

(58) Field of Classification Search
CPC ..... H04L 67/12; B23Q 17/2409; B23Q 17/22; B23Q 17/12; H04W 4/70; H04W 84/12;
(Continued)

(56) References Cited

U.S. PATENT DOCUMENTS

| | | |
|---|---|---|
| 6,981,311 B2 | 1/2006 | Seith et al. |
| 7,769,510 B2 | 8/2010 | Denholm et al. |

(Continued)

FOREIGN PATENT DOCUMENTS

| | | |
|---|---|---|
| DE | 19933812 | 2/2001 |
| DE | 10025760 | 12/2001 |

(Continued)

OTHER PUBLICATIONS

International Preliminary Report on Patentability in International Application No. PCT/EP2016/076793, dated May 24, 2018, 17 pages (with English translation).

(Continued)

*Primary Examiner* — Kiet Tang
(74) *Attorney, Agent, or Firm* — Fish & Richardson P.C.

(57) ABSTRACT

Methods, sensors, and machines for transmitting machine access data of a machine to a wireless measurement sensor attached to the machine. A method of transmitting access data of a communication interface of a machine to a wireless measurement sensor attached to the machine includes: controlling a machine component of the machine which influences the measurement signals of the measurement sensor, according to specific information associated with the access data and evaluating the measurement signals to determine the access data of the communication interface of the machine.

20 Claims, 1 Drawing Sheet

(51) Int. Cl.
  *H04W 4/70* (2018.01)
  *G06F 3/0484* (2013.01)
  *H04W 12/00* (2009.01)
  *B23Q 17/12* (2006.01)
  *B23Q 17/22* (2006.01)
  *B23Q 17/24* (2006.01)
  *H04W 84/12* (2009.01)

(52) U.S. Cl.
  CPC .......... *B23Q 17/2409* (2013.01); *H04W 4/70* (2018.02); *H04W 12/003* (2019.01); *H04W 12/00504* (2019.01); *H04W 12/00508* (2019.01); *H04W 84/12* (2013.01)

(58) Field of Classification Search
  CPC ..... H04W 12/00504; H04W 12/00508; H04W 12/003
  See application file for complete search history.

(56) References Cited

U.S. PATENT DOCUMENTS

| | | |
|---|---|---|
| 8,203,299 B2 | 6/2012 | Zagromski |
| 8,634,851 B2 | 1/2014 | Mueller et al. |
| 2011/0285532 A1* | 11/2011 | Hedin .................... G01H 1/003 340/540 |
| 2012/0218205 A1* | 8/2012 | Park .................... G06F 3/04842 345/173 |
| 2014/0028818 A1 | 1/2014 | Brockway et al. |
| 2014/0056171 A1 | 2/2014 | Clegg |
| 2015/0163210 A1* | 6/2015 | Meyers .................... H04W 4/70 726/4 |

FOREIGN PATENT DOCUMENTS

| | | |
|---|---|---|
| DE | 102009009188 | 8/2010 |
| DE | 112009003536 | 5/2012 |
| DE | 102011083817 | 4/2013 |
| EP | 1454713 | 9/2004 |
| EP | 2073085 | 6/2009 |

OTHER PUBLICATIONS

International Search Report and Written Opinion in International Application No. PCT/EP2016/076793, dated Jan. 2, 2017, 34 pages (with English translation).

* cited by examiner

TRANSMITTING MACHINE ACCESS DATA TO A WIRELESS MEASUREMENT SENSOR OF THE MACHINE

CROSS REFERENCE TO RELATED APPLICATIONS

This application is a continuation of and claims priority under 35 U.S.C. § 120 from PCT Application No. PCT/EP2016/076793 filed on Nov. 7, 2016, which claims priority from German Application No. DE 10 2015 222 395.7, filed on Nov. 13, 2015. The entire contents of these priority applications are incorporated herein by reference.

TECHNICAL FIELD

The present invention relates to methods, sensors, and machines for transmitting machine access data of a machine to a wireless measurement sensor attached to the machine.

BACKGROUND

For leveling machine tools, sensors to be used are attached at predetermined attachment positions of a machine tool and are only able to communicate wirelessly. Unlike wired sensors, the position of wireless sensors is not automatically determined by the connection of a particular cable to a particular controller input. The wireless sensors generally have no operating panel and must therefore be configured manually, in particular via an additional programming device, to the correct wireless data transmission system of the machine tool. The initial operation and the replacement of sensors result in a high level of configuration effort on the machine tool and a high level of susceptibility to errors (configuration to incorrect machine tools, incorrect Wi-Fi, incorrect Bluetooth host, etc.). In particular, the access data about the data transmission system must be manually input at the wireless sensor.

SUMMARY

Implementations of the present invention provide methods, sensors, and machines for transmitting machine access data of a machine to a wireless measurement sensor attached to the machine, which can reduce the effort and the susceptibility to errors during the data transmission by using a method of the kind initially specified, and to specify a suitable measurement sensor and a suitable machine therefor.

For example, for wirelessly transmitting access data from the machine to the measurement sensor, a machine component of the machine which influences the measurement signal of the measurement sensor is controlled in an information-specific manner, and information-specific measurement signals are thereby generated at the measurement sensor, and in that the measurement signals are evaluated as access data by the measurement sensor itself.

One aspect of the present invention features a method of transmitting access data of a communication interface of a machine to a wireless measurement sensor attached to the machine. The method includes: controlling a machine component of the machine which influences the measurement signals of the measurement sensor, according to specific information associated with the access data; and evaluating, by the measurement sensor, the measurement signals to determine the access data of the communication interface of the machine.

According to the present invention, the wireless sensor is fixedly mounted on the machine, and a motion program of the machine component which, for example, is automatically generated, is then started on the machine, which causes the machine to vibrate. In the case of an NC (numerical control) machine tool, an NC program is automatically generated as a motion program, via which the machine component is moved in a defined manner along the machine axes. The access data about a machine-side communication interface (Wi-Fi ESSID (Extended Service Set Identification)+Key, BT (Bluetooth) Host MAC address (media access control) address, etc.) is modulated into this motion program. The wireless sensor measures the vibrations introduced into the machine via movement of the machine axes, and decodes the access data. Via this access data, the sensor is subsequently able (via Wi-Fi ESSID+Key, BT Host MAC address, . . . ) to connect wirelessly to the machine-side communication interface. The manual effort required for the initial configuration of the sensors is limited to starting the motion program which is automatically generated on the machine. Incorrect configurations of sensors are eliminated via this automatic method. The decoded or evaluated measurement signals may form a code, in particular a Morse code.

In addition to the intended control of the machine component, for example, in the case of a machine tool, in addition to the control of a tool, machining head, workpiece table, assembly, etc. required for workpiece machining, according to the present invention, the control of the machine component is also used to transmit information from the machine to a sensor. The information contained in the control of the machine component is evaluated by the sensor itself as access data. The manual effort required for the initial configuration or the replacement of sensors is limited to starting a control program on the machine. Incorrect configurations of sensors are eliminated via this automatic method. The present invention may generally be used on all types of wireless measurement sensors, for example, leveling sensors, vibration sensors, sound sensors, light-sensitive sensors, temperature sensors, pressure sensors, flow velocity sensors, cameras, etc., in which it is possible to directly or indirectly influence their measurement signal by controlling the machine component. The data transmission may, for example, be carried out via modulated control of the machine component, for example, in the case of a light-sensitive sensor, by modulating the light of a light-emitting machine component (e.g., laser), or in the case of a temperature sensor, by modulating the temperature of a heat-generating machine component.

In some implementations, the machine component is a movable machine component which is moved relative to the sensor in an information-specific manner. In addition to the intended motion of the machine component, for example, in the case of a machine tool, in addition to the motion of a tool, machining head, or workpiece table which is required for workpiece machining, according to the present invention, the motion of the machine component is also used to transmit information from the machine to a sensor. The information contained in the motion of the machine component is evaluated as configuration information either by the sensor itself or by the machine. The manual effort required for the initial configuration or the replacement of sensors is limited to starting a motion program on the machine. Incorrect configurations of sensors are eliminated via this automatic method.

In some cases, the machine component is moved according a predetermined spatial and/or temporal motion pattern.

The motion of the machine component may have multiple, in particular similar motion segments, or motion segments having different speeds, having different accelerations, and/ or having rest periods with different durations.

In a preferred method variant, for example, during initial operation of a wireless sensor, the actual attachment position of the sensor on the machine is determined by the sensor itself (self-identification) or by the machine (machine identification) based on the evaluated measurement signals of the sensor, from multiple possible attachment positions. The machine has, for example, a wireless data transmission system (Wi-Fi or the like), via which it is also able to exchange data bidirectionally with sensors having a significance which is not known to the machine.

In the case of self-identification, the sensor determines its actual attachment position on the machine from its measurement signals and from received machine component position data. Reference measurement values or threshold values are stored in the sensor, which are compared to the measurement signal of the sensor for determining the actual attachment position of the sensor. In the case of vibration sensors, the machine component can be moved in such a way that different vibrations are generated at all attachment positions, i.e., the reference measurement values differ for all attachment positions. Alternatively, the machine component may be moved in the direction towards all possible attachment positions of the sensor, to generate vibrations there, and then, the attachment position at which the strongest measured value is measured in the sensor, or at which a predetermined threshold value is merely exceeded, is associated with a sensor. The predetermined reference measured value is either set to a default value or is downloaded previously from the machine to the sensors.

In the case of machine identification, the machine performs specific motions via the machine component at various defined axis positions, and simultaneously records the measurement signals of all non-associated sensors. Subsequently, the machine correlates the measurement signal of each non-associated sensor in sequence with the known reference measurement signals, and in the case of a match, assigns the corresponding attachment position to the sensor. In other words, for each of the multiple attachment positions, reference measurement values are stored in the machine, which are correlated with the measurement signals of the sensor which are transmitted to the machine, for determining the actual attachment position of the sensor.

Another aspect of the present invention features a wireless measurement sensor including a communication interface for forming a wireless communication link to a different communication interface, and including a signal processing unit which is programmed to determine access data about the other communication interface from received measurement signals. The signal processing unit includes at least one processor and at least one non-transitory machine-readable storage medium coupled to the at least one processor having machine-executable instructions stored thereon that, when executed by the at least one processor, cause the at least one processor to perform operations including: measuring one or more measurement signals that are influenced by controlling a machine component of a machine according to specific information associated with access data of a machine-side communication interface of the machine; and evaluating the measurement signals by the measurement sensor to determine the access data of the communication interface of the machine. The communication interface of the measurement sensor is configured to form the wireless communication link with the machine-side communication interface via the determined access data.

Reference measurement values or threshold values can be stored in a data memory of the sensor, and the signal processing unit is programmed to determine the actual attachment position of the sensor to the machine, via a comparison of the measured measurement signals to the reference measurement values or to the threshold values from multiple possible attachment positions.

A further aspect of the present invention features a machine including a wireless measurement sensor as configured above, a controllable machine component which influences the measurement signal of the measurement sensor, a machine-side communication interface, and a machine controller which is programmed to control the machine component in an information-specific manner, for wirelessly transmitting access data about the machine-side communication interface from the machine to the measurement sensor. The measurement sensor is configured to measure one or more measurement signals influenced by the machine component being controlled according to specific information associated with the access data; evaluate the measurement signals to determine the access data of the machine-side communication interface; and wirelessly connect to the machine-side communication interface via the determined access data.

Within the scope of the present invention, a machine is generally to be understood to mean a device having movable parts, for example, a machine tool, a laser processing machine, as well as a high-bay warehouse having moved bay parts, or a facility having conveyor belts and controllable assemblies.

Particularly, the machine component can be a movable machine component, and the machine controller can be programmed to move the machine component relative to the sensor in an information-specific manner, for wirelessly transmitting access data from the machine to the sensor. For example, the machine controller can be configured to move the machine component relative to the measurement sensor according to a motion program modulated with the access data. The machine controller can be configured to automatically generate the motion program to cause the machine component to move. The machine controller can be configured to: receive the measurement signals transmitted from the measurement sensor via the machine-side communication interface; and determine an actual attachment position of the measurement sensor on the machine by correlating the measurement signals with respective reference measurement values for multiple attachment positions stored in a memory of the machine controller and selecting the actual attachment position from the multiple attachment positions based on a result of the correlation.

Additional advantages and advantageous embodiments of the subject matter of the present invention will result from the description, the claims, and the drawing. Likewise, the aforementioned features and the features described below may be used individually or in any arbitrary combination. The embodiments shown and described are not to be understood to be an exhaustive enumeration, but rather have an exemplary character for describing the present invention.

DETAILED DESCRIPTION

Figure 1:
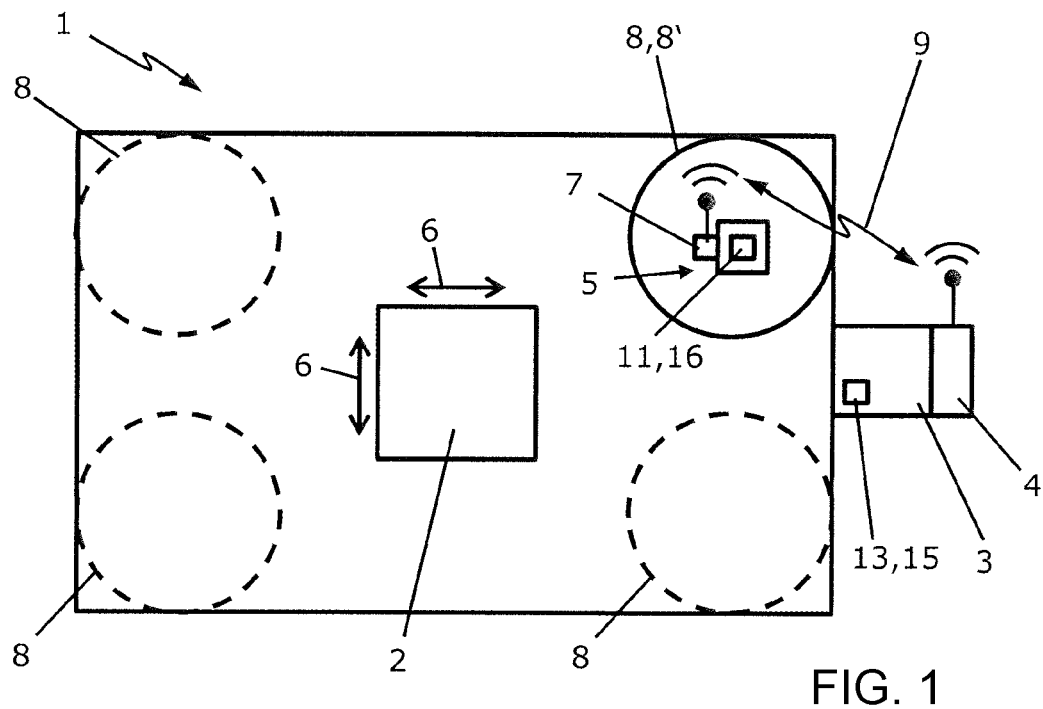
FIG. 1 schematically shows a machine according to the present invention including a movable machine component and including a wireless sensor.

In the following description of the figures, identical reference characters are used for identical or functionally identical components.

A machine 1 which is shown in FIG. 1 includes a movable machine component 2, a machine controller 3 which controls the movement of the machine component 2, a communication interface 4 of a wireless data transmission system (for example, Wi-Fi) which is connected to the machine controller 3, and a wireless measurement sensor 5.

The machine 1 may, for example, be an NC (numerical control) machine tool in which the movable machine component 2 is formed by a tool or workpiece table which is movable along the machine axes (double arrows 6), or a laser processing machine in which the movable machine component 2 is formed by a laser machining head which is movable along the machine axes.

The sensor 5 is, for example, a vibration sensor, having a measurement signal which is directly influenced by the movable machine component 2, but it may also be of any other type of sensor having a measurement signal which is directly or indirectly influenced by the movable machine component 2. The sensor 5 has a communication interface 7 for wirelessly communicating with the machine-side communication interface 4.

After the sensor 5 has been attached to one (8') of multiple predetermined attachment positions 8 of the machine 1, a wireless connection 9 is then established between the sensor-side and the machine-side communication interfaces 4, 7. For this purpose, in the machine controller 3, an automatically generated motion program is started for the machine component 2, which causes the machine 1 to vibrate. In the case of an NC machine tool, an NC program is automatically generated as a motion program, via which the machine component 2 is moved in a defined manner along the machine axes 6. The access data (e.g., Wi-Fi ESSID+Key, BT Host MAC address) about the machine-side communication interface 4 is modulated into this motion program. The motion of the machine component 2 may also carry out a predetermined spatial and/or temporal motion pattern which may include multiple motion segments having different velocities, different accelerations, and/or rest periods with different durations.

Figure 2A:
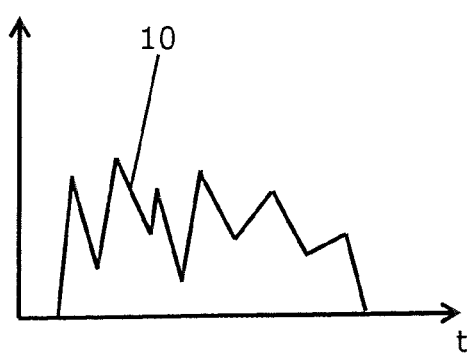
FIGS. 2A, 2B show a measurement signal of the sensor (FIG. 2A) which is plotted over time, and data obtained therefrom (FIG. 2B).
Figure 2B:
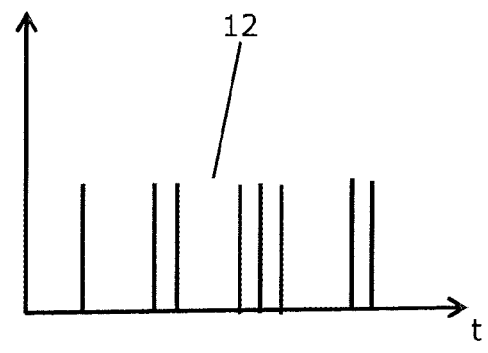

As shown in FIG. 2A, the sensor 5 measures the vibrations introduced into the machine 1 via the movement of the machine component 2 as a temporal measurement signal 10, and from these measurement signals 10, a signal processing unit 11 of the sensor 5 decodes the access data 12 shown in FIG. 2B, which, for example, may form a Morse code. Via this evaluated access data 12, the sensor 5 may subsequently connect wirelessly to the machine-side communication interface 4. The manual effort required for this initial configuration of sensors 5 is limited to starting the automatically generated motion program on the machine 1. Incorrect configurations of sensors 5 are eliminated via this automatic method.

To determine at which of the multiple attachment positions 8 the wireless sensor 5 is actually located, a machine identification or a self-identification of the sensor 5 is also carried out during initial operation.

Figure 3:
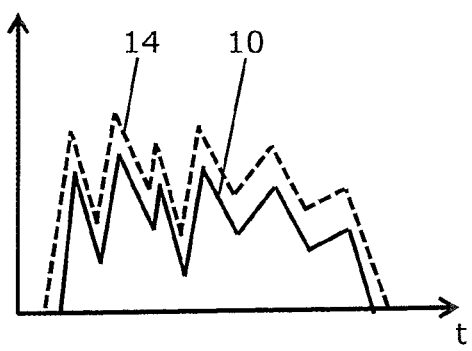
FIG. 3 shows a measurement signal of the sensor which is plotted over time, including associated reference measurement values.

In the case of machine identification, the machine 1 performs specific motions via the machine component 2, at various defined axis positions. The measurement signals 10 are transmitted from the sensor 5 via the wireless connection 9 to the machine controller 3, which includes a data memory 13 in which reference measurement values 14 (as illustrated in FIG. 3) or reference measurement series for the vibrations occurring during the movement of the machine component 2 are stored for each of the multiple attachment positions 8. The machine controller 3 or a machine-side signal processing unit 15 (FIG. 1) correlates the measurement signals 10 of each non-associated sensor 5 with the known reference measurement values 14 and, in the case of a match, assigns the actual attachment position 8' to the sensor 5.

Figure 4:
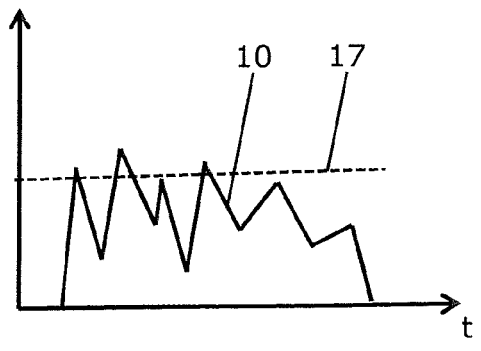
FIG. 4 shows a measurement signal of the sensor plotted over time, including an associated threshold value.

In the case of self-identification, the sensor 5 determines its actual attachment position 8' on the machine 1 from its measurement signals 10 and from received or predetermined machine component position data. The sensor 5 can include a data memory 16 in which reference measurement values 14 are also stored, or, as shown in FIG. 4, a threshold value 17 for the vibrations occurring during the motion of the machine component 2 is stored. The machine component 2 can be moved in such a way that different vibrations are generated at all attachment positions 8, i.e., the reference measurement values 14 differ for all attachment positions 8. Alternatively, the machine component 2 may be moved in the direction of all possible attachment positions 8 of the sensors 5, e.g., towards all possible attachment positions 8, to generate vibrations there; and then, the attachment position at which the measurement signals 10 correlate with the stored reference measurement values 14, or at which the strongest measured value was measured in the sensor 5, or at which the threshold value 17 was merely exceeded, is associated with a sensor 5. The reference measurement values 14 or the threshold value 17 are either set to a default value, or have been previously downloaded from the machine 1 to the sensor 5.

The manual effort required for correlating sensors 5 is limited to starting the motion program which is automatically generated on the machine 1. Erroneous correlations of sensors 5 are eliminated via this automatic correlation method.

Rather than via movement of a movable machine component 2, the data transmission may also take place via modulated control of a (for example, stationary) machine component, for example, in the case of a light-sensitive sensor 5, by modulating the light of a light-emitting machine component (laser) 2, or in the case of a temperature sensor 5, by modulating the temperature of a heat-generating machine component 2.

A number of embodiments of the invention have been described. Nevertheless, it will be understood that various modifications may be made without departing from the spirit and scope of the invention. Accordingly, other embodiments are within the scope of the following claims.

What is claimed is:

1. A method of transmitting access data of a communication interface of a machine to a wireless measurement sensor attached to the machine, the method comprising:
   moving a movable machine component of the machine, which influences measurement signals of the wireless measurement sensor, relative to the wireless measurement sensor according to a motion pattern modulated with the access data; and evaluating, by the wireless measurement sensor, the measurement signals to determine the access data of the communication interface of the machine.

2. The method of claim 1, further comprising:
wirelessly connecting the wireless measurement sensor to the communication interface of the machine via the determined access data.

3. The method of claim 1, wherein evaluating the measurement signals comprises:
evaluating the measurement signals to form a Morse code.

4. The method of claim 1, wherein the motion pattern comprises a motion program modulated with the access data.

5. The method of claim 1, wherein moving the machine component of the machine according to the motion pattern comprises:
moving the machine component in a direction towards each of multiple attachment positions.

6. The method of claim 1, wherein
the motion pattern comprises one of a spatial motion pattern, a temporal motion pattern, and a spatial and temporal motion pattern.

7. The method of claim 1, wherein a movement of the machine component comprises multiple motion segments.

8. The method of claim 7, wherein the motion segments have at least one of: different velocities, different accelerations, or rest periods with different durations.

9. The method of claim 1, wherein the wireless measurement sensor comprises one of a vibration sensor, a leveling sensor, a sound sensor, a light-sensitive sensor, a temperature sensor, a pressure sensor, a flow velocity sensor, or a camera.

10. The method of claim 1, further comprising:
determining an actual attachment position of the wireless measurement sensor on the machine by the wireless measurement sensor.

11. The method of claim 10, wherein determining an actual attachment position of the wireless measurement sensor comprises:
comparing the measurement signals of the wireless measurement sensor to reference measurement values or threshold values stored in the wireless measurement sensor.

12. The method of claim 1, further comprising:
transmitting the measurement signals to the machine,
wherein an actual attachment position of the wireless measurement sensor on the machine is determined by the machine selecting from multiple attachment positions based on the measurement signals.

13. The method of claim 12, wherein the machine comprises a memory for storing a respective reference measurement value for each of the multiple attachment positions, and
wherein the actual attachment position of the wireless measurement sensor on the machine is determined by the machine correlating the measurement signals of the wireless measurement sensor transmitted from the wireless measurement sensor with the respective reference measurement values for the multiple attachment positions stored in the memory.

14. A machine comprising:
a wireless measurement sensor;
a machine component movable to influence a measurement signal of the wireless measurement sensor;
a communication interface; and
a machine controller configured to move the machine component relative to the wireless measurement sensor according to a motion pattern modulated with access data of the communication interface, such that the access data is wirelessly transmitted to the wireless measurement sensor,
wherein the wireless measurement sensor is configured to:
measure one or more measurement signals influenced by the machine component being moved according to the motion pattern associated with the access data;
evaluate the measurement signals to determine the access data of the communication interface; and
wirelessly connect to the communication interface via the determined access data.

15. The machine of claim 14,
wherein the machine controller is configured to move the machine component relative to the wireless measurement sensor according to a motion program modulated with the access data.

16. The machine of claim 15, wherein the machine controller is configured to automatically generate the motion program to cause the machine component to move.

17. The machine of claim 14, wherein the machine controller is configured to:
receive the measurement signals transmitted from the wireless measurement sensor via the communication interface; and
determine an actual attachment position of the wireless measurement sensor on the machine by correlating the measurement signals with respective reference measurement values for multiple attachment positions stored in a memory of the machine controller and selecting the actual attachment position from the multiple attachment positions based on a result of the correlation.

18. The machine of claim 14, wherein the motion pattern comprises one of a spatial motion pattern, a temporal motion pattern, and a spatial and temporal motion pattern.

19. The machine of claim 14, wherein the machine component comprises one of:
a workpiece tool or workpiece table which is movable along axes of an NC (numerical control) machine system, and
a laser machining head which is movable along axes of a laser processing machine.

20. The machine of claim 14, wherein the access data comprises at least one of:
Wi-Fi ESSID (Extended Service Set Identification) and Key, or
BT (Bluetooth) Host MAC (media access control) address.

* * * * *